3,494,192
SYSTEM FOR INDICATING THE QUANTITY OF FLUID IN A SEPARATOR TYPE HYDROPNEUMATIC ACCUMULATOR
Abduz Zahid, Los Angeles, Calif., assignor to Greer Hydraulics, Inc., Los Angeles, Calif., a corporation of New York
Filed Sept. 17, 1968, Ser. No. 760,156
Int. Cl. G01f 23/00
U.S. Cl. 73—290    4 Claims

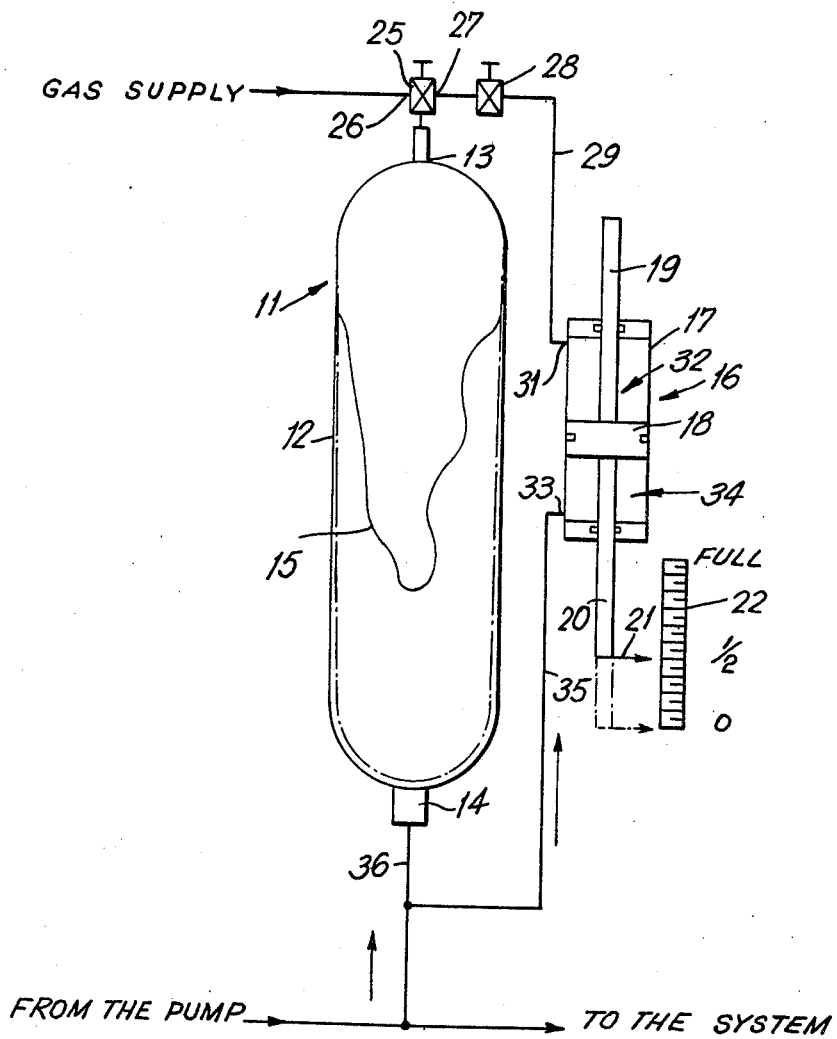

ABSTRACT OF THE DISCLOSURE

The invention relates to a system for detecting the quantity of fluid in a separator type hydropneumatic accumulator comprising a rigid container having an oil port at one end and a gas port at the other with a separator intervening between such ports and defining a chamber on each side thereof in communication respectively with said ports. An indicating unit comprising a cylinder having a movable piston therein with piston rods extending outwardly from the ends of the cylinder is provided, with one of said piston rods carrying an indicating member. Opposed chambers of said cylinder are connected to the gas port and oil port respectively of said accumulator with valve means being provided between the gas port and the associated chamber of the cylinder.

---

As conducive to an understanding of the invention, it is noted that in pressure accumulators of the above type, unless means are provided to indicate the quantity of oil in the accumulator, there is a possibility that although pressure gauges may indicate that the accumulator is charged to a desired pressure, there may not be sufficient oil in the accumulator to enable the latter to perform its intended function when a valve controlling the oil port is opened during normal use of the accumulator.

It is accordingly among the objects of the invention to provide a fluid indicating system which may readily be connected to a conventional hydraulic system using a pressure accumulator, without need for complex piping, valving or pressure gauges and which will dependably indicate the quantity of oil in the accumulator at all times, which system is simple in operation and not likely to become deranged even after long use.

According to the invention, these objects are accomplished by the arrangement and combination of elements hereinafter described and more particularly recited in the claims.

In the accompanying drawings in which is shown one of various possible embodiments of the several features of the invention, the single figure is a diagrammatic view of an accumulator system incorporating the fluid indicating device of the invention.

Referring now to the drawings, the pressure accumulator 11 which illustratively is of the deformable partition type, comprises a container or pressure vessel 12 preferably of strong rigid material such as steel, cast aluminum or the like, capable of withstanding high pressure. The container may be cylindro-spherical as shown and has a deformable partition intervening between the gas inlet port 13 and a liquid outlet port 14 of the container. Preferably, the partition is a collapsible and expansible bladder 15 which is desirably of resilient material such as rubber or synthetic plastic of like physical characteristics which in distended but substantially unstretched condition is smaller than the cavity of the container and the inlet 13 leads into the rubber bladder 15.

An indicator device 16 is provided which comprises a cylinder 17 in which a piston 18 is slidably mounted, said piston having piston rods 19 and 20 secured to opposed sides thereof and extending through the ends of the cylinder 17.

An indicator member or pointer 21 is carried by the end of piston rod 20 and a scale device 22 is positioned adjacent the pointer 21, said scale device 22 being calibrated to indicate the quantity of liquid, such as an oil, in the accumulator.

The gas port 13 of the accumulator is connected to a main valve 25 which has a port 26 which is connected to the source of gas under pressure and a port 27 which is connected through control valve 28 and line 29 to port 31 leading into chamber 32 on one side of the piston 18. The port 33 of the cylinder 17 which is in communication with the chamber 34 on the other side of piston 18 is connected by line 35 to line 36, the latter being connected to the oil port 14 and to the utilization system in which the accumulator 11 is incorporated.

In operation of the system, with the valves 25 and 28 is open, the gas under pressure will flow into port 31 pressure through port 13, the bladder expanding to substantially completely fill the interior of the container 12 as shown in broken lines. At the same time, since valve 28 is open, the gas under pressure will flow into port 31 of indicating device 16 to move the piston 18 thereof downwardly so that the indicator 21 will be moved to the position shown in broken lines which will thus indicate zero oil in the accumulator. Since the bladder 15 and chamber 32 are both connected to the charging source, the pressure in the bladder 15 and chamber 32 will be the same.

Thereupon, both of the valves 25 and 28 are closed so that chamber 32 will be isolated at such time with the gas in chamber 32 at the same pressure as the gas in the bladder. The accumulator 11 is charged with oil under pressure from the pump, such oil entering the container 12 through port 14.

As the oil is forced through the port 14 of the accumulator, it will cause the bladder to be compressed and moved, for example, to the position shown in full lines in the drawing.

At the same time, the oil under pressure will enter port 33 and cause the piston 18 to be moved to the position shown in full lines in the drawings.

Since the initial gas precharge pressure in the bladder 15 and in chamber 32 of cylinder 17 was the same, the compression ratio of the gas in bladder 15 and in chamber 32 will be the same and the quantity of oil that will enter chamber 34 to displace the piston 18 will be proportional to the quantity of oil entering the accumulator. Therefore, displacement of the piston 18 and hence of the indicator 21 will be directly proportional to the quantity of oil present in the accumulator.

Thus, assuming that the accumulator 11 is half filled, the piston 18 and indicator 21 will be moved to position to indicate such amount and this position can readily be correlated in gallons, for example, so that a clear indication is afforded at all times to the operator as to the available oil present in the accumulator.

Thus, depending upon the quantity of oil required for the device that is controlled by the accumulator, the operator will have a visible indication of whether or not the accumulator is sufficiently charged with oil to accomplish its desired function.

Although the accumulator illustratively shown is of the deformable separator type, the detector could be used in conjunction with a piston type accumulator.

It is of course within the scope of the invention to have an electrical indicating system controlled by the movement of the indicator so that in addition to a visual indication of the quantity of oil present, an audible signal may be given.

Having thus described my invention, what I claim as new and desire to secure by Letters Patent of the United States is:

1. A system for indicating the quantity of fluid in a hydropneumatic accumulator of the type having a rigid container with a gas port and a liquid port and a partition intervening between said ports, said system comprising a cylinder with a movable piston therein defining a chamber on each side thereof, an indicator device operatively connected to said piston, means connecting said chambers respectively to the gas port and liquid port of said accumulator and means to charge said accumulator through said gas port and liquid port with gas and liquid under pressure.

2. The combination set forth in claim 1 in which means are provided to establish the same compression ratio between the liquid and gas in the accumulator and the liquid and gas in the indicator.

3. The combination set forth in claim 1 in which a fluid line connects said gas and liquid ports to the associated chamber of said indicating cylinder and valve means are provided in the line leading to said gas port.

4. The combination set forth in claim 1 in which a piston rod is connected to said piston and extends through both ends of said indicating cylinder, said indicating device being carried by the protruding portion of one of said piston rods.

References Cited

UNITED STATES PATENTS 1,791,120   2/1931   Cain _____ 73—290

S. CLEMENT SWISHER, Primary Examiner

U.S. Cl. X.R.

138—30, 104